United States Patent
Origane et al.

(10) Patent No.: US 9,843,184 B2
(45) Date of Patent: Dec. 12, 2017

(54) VOLTAGE CONVERSION APPARATUS

(71) Applicants: Toshinori Origane, Aichi (JP); Koji Hachiya, Hyogo (JP)

(72) Inventors: Toshinori Origane, Aichi (JP); Koji Hachiya, Hyogo (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 160 days.

(21) Appl. No.: 15/047,744

(22) Filed: Feb. 19, 2016

(65) Prior Publication Data

US 2016/0248247 A1 Aug. 25, 2016

(30) Foreign Application Priority Data

Feb. 20, 2015 (JP) ................. 2015-031260

(51) Int. Cl.
*H02J 1/00* (2006.01)
*H02M 3/158* (2006.01)
*H02J 1/08* (2006.01)
*H02J 7/34* (2006.01)
*H02J 7/00* (2006.01)

(52) U.S. Cl.
CPC ............. *H02J 1/08* (2013.01); *H02J 7/345* (2013.01); *H02J 2007/0059* (2013.01)

(58) Field of Classification Search
CPC ....... H02J 1/08; H02J 7/345; H02J 2007/0059
See application file for complete search history.

(56) References Cited

U.S. PATENT DOCUMENTS

| 7,088,595 B2 | 8/2006 | Nino | |
|---|---|---|---|
| 2003/0155814 A1* | 8/2003 | Gronbach | B60L 11/1868 307/130 |
| 2010/0194318 A1* | 8/2010 | Aso | B60L 11/1868 318/400.3 |
| 2010/0231178 A1* | 9/2010 | Handa | H02J 7/0065 320/163 |

(Continued)

FOREIGN PATENT DOCUMENTS

| JP | 2001-268900 A | 9/2001 |
|---|---|---|
| JP | 2001-292567 | 10/2001 |

(Continued)

*Primary Examiner* — Jared Fureman
*Assistant Examiner* — Michael Warmflash
(74) *Attorney, Agent, or Firm* — Osha Liang LLP

(57) ABSTRACT

A voltage conversion apparatus includes connection terminals to which a battery, a capacitor, and a protected load are respectively connected, a first DC-DC converter having input/output terminals, a second DC-DC converter having input/output terminals, a first power path having one end connected to the first connection terminal and the other end connected to the first input/output terminal, a second power path having one end connected to the second input/output terminal and the other end connected to the third input/output terminal, a third power path having one end connected to the fourth input/output terminal and the other end connected to the second connection terminal, and a fourth power path having one end connected to a midway part of the second power path and the other end connected to the third connection terminal.

10 Claims, 11 Drawing Sheets

(56) References Cited

U.S. PATENT DOCUMENTS

| | | | | |
|---|---|---|---|---|
| 2010/0308659 A1* | 12/2010 | Morita | ............... | H01M 10/44 |
| | | | | 307/66 |
| 2012/0032504 A1* | 2/2012 | Akimasa | ............ | H01M 10/44 |
| | | | | 307/9.1 |
| 2015/0303731 A1* | 10/2015 | Takahashi | ............. | H02J 3/32 |
| | | | | 320/127 |
| 2015/0311799 A1* | 10/2015 | Okaniwa | ............... | B60L 1/00 |
| | | | | 323/271 |

FOREIGN PATENT DOCUMENTS

| JP | 2005-295671 A | 10/2005 |
|---|---|---|
| JP | 2011-155791 A | 8/2011 |
| JP | 4835690 B2 | 12/2011 |

\* cited by examiner

In standby

In initial starting of starter motor
Regenerative system 200

In initial running

In generation of regenerated power
Regenerative system 200

In no power generation and no starting of starter motor
Regenerative system 200

In starting of starter motor after idling stop (capacitor voltage ≥ predetermined value)

VOLTAGE CONVERSION APPARATUS

CROSS-REFERENCE TO RELATED APPLICATION

This application is based on Japanese Patent Application No. 2015-031260 filed with the Japan Patent Office on Feb. 20, 2015, the entire contents of which are incorporated herein by reference.

FIELD

The disclosure relates to a voltage conversion apparatus that raises or lowers voltages from a plurality of DC power supplies and supplies the raised or lowered voltages to a load.

BACKGROUND

A vehicle having an idling stop function and a deceleration regenerative function has been developed for the conservation of the global environment and the improvement in fuel consumption rate (fuel efficiency). This kind of vehicle is provided with a plurality of DC power supplies including a battery and a capacitor and a voltage conversion apparatus including a DC-DC converter. The voltage conversion apparatus raises or lowers a voltage from each of the DC power supplies and supplies the raised or lowered voltage to a load. The voltage conversion apparatus also stores regenerated power generated by a generator provided in the vehicle in, for example, the capacitor.

For example, in a voltage conversion apparatus of JP 2011-155791 A or a voltage conversion apparatus illustrated in FIG. 7 of JP 4835690 B1, a switch is disposed on a power path between a load (a narrow voltage range auxiliary machine) that requires protection so as to prevent a voltage supplied thereto from dropping and a battery. A power storage is connected to a power path between the load and the switch through a DC-DC converter. A generator, a starter motor, and other loads (an auxiliary machine and a wide voltage range auxiliary machine) are connected to a power path between the battery and the switch.

For example, when the generator generates regenerated power due to deceleration of the vehicle, the switch is turned on to drive the DC-DC converter and the regenerated power is stored in the power storage. When the generator generates no regenerated power when the vehicle is in a state other than idling stop, the switch is turned on to drive the DC-DC converter and the power storage is discharged. In this case, in JP 2011-155791 A, the power storage is discharged up to a voltage with which the DC-DC converter can operate and the power storage can continuously drive the load throughout a specified period in which the voltage of the battery instantaneously drops.

When an engine is restarted after idling stop of the vehicle, a large current flows through the starter motor by starting the starter motor and the voltage of the battery instantaneously drops. Thus, at this time, the switch is turned off to electrically separate the load and the power storage from the battery and the starter motor, and the power of the power storage is supplied to the load through the DC-DC converter. Accordingly, the load is continuously and stably driven with the power of the power storage.

The DC-DC converter of the voltage conversion apparatus includes, for example, a bidirectional voltage raising/lowering chopper circuit as disclosed in JP 2001-268900 A, JP 2001-292567 A, and JP 2005-295671 A. The bidirectional voltage raising/lowering chopper circuit includes two half bridge circuits and reactor. Each of the half bridge circuits includes two switching elements connected in series. One end of the reactor is connected between the switching elements of one of the half bridge circuits, and the other end of the reactor is connected between the switching elements of the other half bridge circuit.

A load connected to a voltage conversion apparatus may have a trouble in its operation when the voltage supplied thereto drops lower than a predetermined value. Thus, it is necessary to stably supply power to such a load.

In a voltage conversion apparatus to which a plurality of DC power supplies are connected, when one of the DC power supplies is intensively used, the life of this DC power supply is shortened. Thus, in order to increase the life of each of the DC power supplies, it is necessary to effectively use the power of each of the DC power supplies. When a battery and a capacitor are connected, as the plurality of DC power supplies, to the voltage conversion apparatus corresponding to the deceleration regenerative function, it is preferred to increase the opportunity of using regenerated power stored in the capacitor.

SUMMARY

One or more embodiments The purpose of the disclosure provide a voltage conversion apparatus capable of stably supplying power to a load and effectively using the power of each DC power supply.

A first DC power supply, a second DC power supply, and a load are connected to a voltage conversion apparatus according to one or more embodiments of the disclosure. The voltage conversion apparatus is configured to convert a voltage of each of the first and second DC power supplies to a voltage of a different magnitude and to supply the converted voltage to the load. The voltage conversion apparatus includes a first connection terminal to which the first DC power supply is connected; a second connection terminal to which the second DC power supply is connected; a third connection terminal to which the load is connected; a first DC-DC converter having a first input/output terminal and a second input/output terminal; a second DC-DC converter having a third input/output terminal and a fourth input/output terminal; a first power path having one end connected to the first connection terminal and the other end connected to the first input/output terminal; a second power path having one end connected to the second input/output terminal and the other end connected to the third input/output terminal; a third power path having one end connected to the fourth input/output terminal and the other end connected to the second connection terminal; and a fourth power path having one end connected to a midway part of the second power path and the other end connected to the third connection terminal.

In the above, it is possible to supply the power from the first DC power supply to the load through the first connection terminal, the first power path, the first DC-DC converter, the second power path, the fourth power path, and the third connection terminal. In this case, the voltage from the first DC power supply can be converted to a voltage corresponding to the load by the first DC-DC converter. Further, it is possible to supply the power from the second DC power supply to the load through the second connection terminal, the third power path, the second DC-DC converter, the second power path, the fourth power path, and the third connection terminal. In this case, the voltage from the second DC power supply can be converted to a voltage corresponding to the load by the second DC-DC converter. Thus, it is possible to stably supply the power from the first DC power supply and the second DC power supply to the load. Further, it is possible to increase the opportunity of using the power of each of the first and second DC-DC power supplies to effectively use the power of each of the first and second DC-DC power supplies.

In the voltage conversion apparatus in one or more embodiments of the disclosure, the first DC-DC converter may include a first switching element and a second switching element connected in series in the same direction between a ground and the second input/output terminal, a first choke coil having one end connected between the first switching element and the second switching element and the other end connected to the first input/output terminal, a first capacitor having one end connected between the first input/output terminal and the first choke coil and the other end connected to the ground, and a second capacitor having one end connected between the second input/output terminal and the second switching element and the other end connected to the ground. Further, the second DC-DC converter may include a third switching element and a fourth switching element connected in series in the same direction between a ground and the third input/output terminal, a second choke coil having one end connected between the third switching element and the fourth switching element and the other end connected to the fourth input/output terminal, a third capacitor having one end connected between the fourth input/output terminal and the second choke coil and the other end connected to the ground, and a fourth capacitor having one end connected between the third input/output terminal and the fourth switching element and the other end connected to the ground.

In the voltage conversion apparatus in one or more embodiments of the disclosure, the first DC-DC converter may be configured to raise a voltage input through the first input/output terminal and to output the raised voltage through the second input/output terminal and configured to lower a voltage input through the second input/output terminal and to output the lowered voltage through the first input/output terminal. Further, the second DC-DC converter may be configured to lower a voltage input through the third input/output terminal and to output the lowered voltage through the fourth input/output terminal and configured to raise a voltage input through the fourth input/output terminal and to output the raised voltage through the third input/output terminal.

In one or more embodiments of the disclosure, the voltage conversion apparatus may further include a fifth power path having one end connected to a midway part of the first power path and the other end connected to the third connection terminal and a fifth switching element disposed on the fifth power path.

In one or more embodiments of the disclosure, the voltage conversion apparatus may further include a sixth switching element disposed on the fourth power path.

In one or more embodiments of the disclosure, the voltage conversion apparatus may further include a controller configured to control the first DC-DC converter, the second DC-DC converter, and the first to sixth switching elements. The load may be a protected load that requires protection so as to prevent a voltage supplied thereto from dropping. A large current load through which a large current flows during operation and a generator configured to generate regenerated power may be connected to the first DC power supply in parallel. The second DC power supply may be configured to store the regenerated power generated by the generator. In this case, the controller is configured to operate the first DC-DC converter and the second DC-DC converter, to turn on the fifth switching element, and to turn off the sixth switching element when the generator generates no power and the large current load is not in operation, and configured to operate at least the second DC-DC converter, to turn off the fifth switching element, and to turn on the sixth switching element when the large current load is in operation.

In one or more embodiments of the disclosure, the voltage conversion apparatus may further include a current detector configured to detect a current flowing from the second DC-DC converter to the first DC-DC converter. When the generator generates no power and the large current load is in operation, the controller may be configured to limit a current flowing to the first DC-DC converter to a specified value that constitutes no obstacle to drive of the protected load or less on the basis of a value detected by the current detector.

In one or more embodiments of the disclosure, the voltage conversion apparatus may further include a voltage detector configured to detect a voltage of the second DC power supply. When the generator generates no power and the large current load is in operation, the controller may be configured to operate the first DC-DC converter and the second DC-DC converter, to turn off the fifth switching element, and to turn on the sixth switching element when the voltage of the second DC power supply detected by the voltage detector is equal to or more than a predetermined value that is larger than a voltage required to drive the protected load, and configured to operate the second DC-DC converter, to stop the first DC-DC converter, to turn off the fifth switching element, and to turn on the sixth switching element when the voltage of the second DC power supply is less than the predetermined value.

In the voltage conversion apparatus in one or more embodiments of the disclosure, the controller may be configured to operate the first DC-DC converter and the second DC-DC converter, to turn on the fifth switching element, and to turn off the sixth switching element when the large current load is not in operation to supply power of the second DC power supply to the protected load through the first DC-DC converter, the second DC-DC converter and the fifth switching element and to supply power of the first DC power supply to the protected load through the fifth switching element. Further, the controller may be configured to operate the first DC-DC converter and the second DC-DC converter, to turn off the fifth switching element, and to turn on the sixth switching element when the large current load is in operation to supply power of the second DC power supply to the protected load through the second DC-DC converter and the sixth switching element and to supply power of the second DC power supply to the large current load through the first DC-DC converter and the second DC-DC converter.

In the voltage conversion apparatus in one or more embodiments of the disclosure, the controller may be configured to operate the first DC-DC converter and the second DC-DC converter, to turn on the fifth switching element, and to turn off the sixth switching element when the generator generates a regenerated power to charge the second DC power supply with the regenerated power and to supply the regenerated power to the protected load through the fifth switching element.

One or more embodiments of the disclosure make it possible to stably supply power to a load and to effectively use the power of each DC power supply.

DETAILED DESCRIPTION

Embodiments An exemplary embodiment of the disclosure present invention will be described with reference to the drawings. Identical reference signs designate identical or corresponding parts throughout the drawings. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention.

Figure 1:
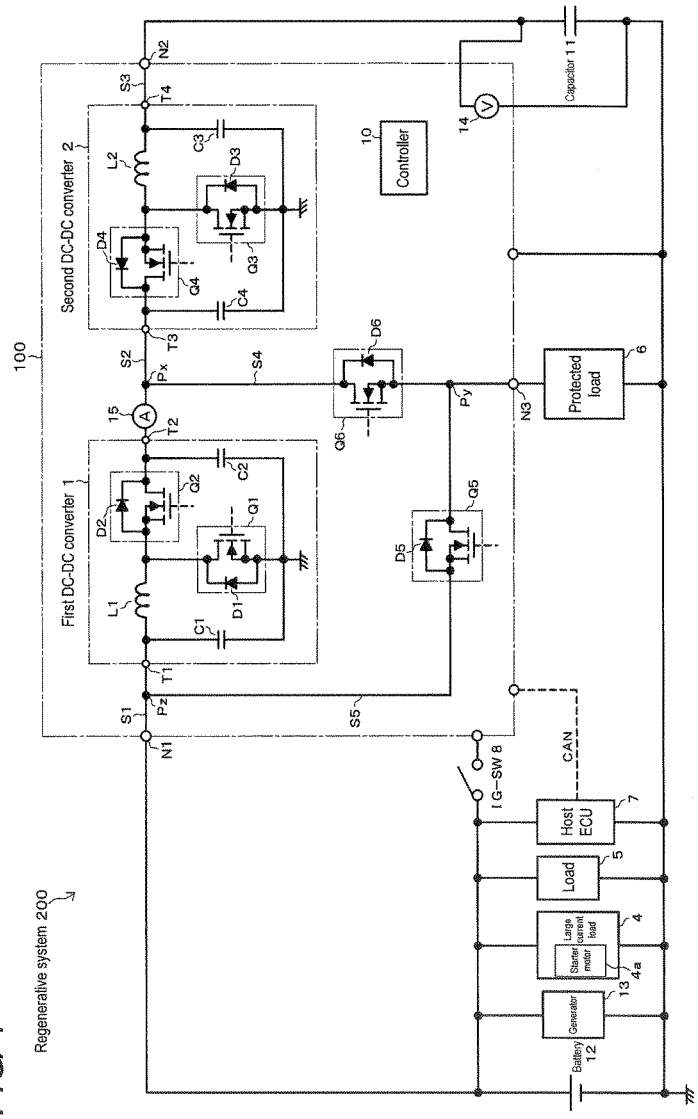
FIG. 1 is a diagram illustrating a circuit configuration of a voltage conversion apparatus according to one or more embodiments of the disclosure.

First, a circuit configuration of a voltage conversion apparatus 100 of the embodiment and the surroundings thereof will be described with reference to FIG. 1. In FIG. 1, a solid line indicates power system wiring, and a broken line indicates control system wiring or communication system wiring (the same applies to the other drawings).

A regenerative system 200 illustrated in FIG. 1 is mounted on a vehicle that has an idling stop function and a deceleration regenerative function. The regenerative system 200 includes the voltage conversion apparatus 100, a capacitor 11, a battery 12, a generator 13, a large current load 4, a load 5, a protected load 6, a host electronic control unit (ECU) 7, and an ignition switch (IG-SW) 8.

The capacitor 11 includes an electric double layer capacitor. The capacitor 11 is an example of a "second DC power supply" in one or more embodiments of the disclosure. Alternatively, for example, the second DC power supply may include a lithium ion battery, a lithium ion capacitor, or a nickel-hydride rechargeable battery.

The battery 12 includes a conventional lead battery. The battery 12 is an example of a "first DC power supply" in one or more embodiments of the disclosure. The first DC power supply may include a battery or a cell other than a conventional lead battery.

The generator 13 is driven by an engine of the vehicle (not illustrated) to generate power. For example, when the voltage of the battery 12 drops during normal running of the vehicle, the generator 13 is driven by a driving force of the engine to generate power. The vehicle keeps running also during deceleration of the vehicle and during a braking operation of the vehicle. Thus, the engine remains rotating even when no fuel is supplied to the engine. This rotating force is used to drive the generator 13 to generate power. The power generated by the generator 13 during deceleration is called regenerated power. The capacitor 11 stores the power generated by the generator 13.

The fuel supply to the engine is stopped during deceleration of the vehicle. That is, the power generation is performed without fuel consumption. Thus, the fuel consumption rate of the vehicle is improved. When the voltage of the battery 12 is sufficient during normal running, power generation by the generator 13 is not performed.

The large current load 4 includes an electric motor through which a large current flows during operation. The large current load 4 includes a starter motor 4a for starting the engine. As other examples, the large current load 4 includes a motor for power steering and a dynamo-electric brake (not illustrated).

The load 5 includes electrical equipment that is not required to be used during idling stop of the vehicle. The load 5 includes, for example, an electrothermal seat heater.

The protected load 6 includes electrical equipment that requires power supply also during idling stop of the vehicle and requires protection so as to prevent a voltage supplied thereto from dropping, for example, when the engine is restarted (the starter motor 4a is started) after idling stop. The protected load 6 includes, for example, a navigation system, an audio, an air conditioner, a meter, a transmission, and a safety device.

The host ECU 7 is connected to the voltage conversion apparatus 100 through, for example, a controller area network (CAN). The host ECU 7 transmits information indicating a state of the vehicle and an operation instruction to the voltage conversion apparatus 100.

One end of the IG-SW 8 is connected to a positive electrode of the battery 12. The other end of the IG-SW 8 is connected to the voltage conversion apparatus 100. A negative electrode of the battery 12 is grounded. The large current load 4, the generator 13, the load 5, and the host ECU 7 are connected to the battery 12 in parallel.

The voltage conversion apparatus 100 converts a voltage from each of the DC power supplies 11 and 12 connected to the voltage conversion apparatus 100 to a voltage of a different magnitude and supplies the converted voltage to the protected load 6. The voltage conversion apparatus 100 is provided with power paths S1 to S5, connection terminals N1 to N3, a first DC-DC converter 1, a second DC-DC converter 2, a field effect transistor (FET) Q5, FET Q6, a controller 10, a voltage detector 14, and a current detector 15.

The positive electrode of the battery 12 is connected to the first connection terminal N1. The capacitor 11 is connected to the second connection terminal N2. The protected load 6 is connected to the third connection terminal N3. The voltage conversion apparatus 100 is also provided with other connection terminals which are indicated by white circles located on a dot-dash line indicating the voltage conversion apparatus 100 in FIG. 1 (with no reference sign, the same applies to the other drawings).

The first DC-DC converter 1 includes a first input/output terminal T1 and a second input/output terminal T2. The second DC-DC converter 2 includes a third input/output terminal T3 and a fourth input/output terminal T4.

One end of the first power path S1 is connected to the first connection terminal N1. The other end of the first power path S1 is connected to the first input/output terminal T1 of the first DC-DC converter 1. One end of the second power path S2 is connected to the second input/output terminal T2 of the first DC-DC converter 1. The other end of the second power path S2 is connected to the third input/output terminal T3 of the second DC-DC converter 2. One end of the third power path S3 is connected to the fourth input/output terminal T4 of the second DC-DC converter 2. The other end of the third power path S3 is connected to the second connection terminal N2.

One end of the fourth power path S4 is connected to a midway part of the second power path S2. The other end of the fourth power path S4 is connected to the third connection terminal N3. One end of the fifth power path S5 is connected to a midway part of the first power path S1. The other end of the fifth power path S5 is connected to a midway part of the fourth power path S4. That is, the other end of the fifth power path S5 is connected to the third connection terminal N3 through a part of the fourth power path S4.

As illustrated in FIG. 1, the second power path S2 and the fourth power path S4 are connected at a connection point Px. The fourth power path S4 and the fifth power path S5 are connected at a connection point Py. The first power path S1 and the fifth power path S5 are connected at a connection point Pz.

The FET Q5 includes an N-channel metal oxide semiconductor field effect transistor (MOSFET). The FET Q6 includes an N-channel MOSFET.

The FET Q5 is disposed on the fifth power path S5. A drain of the FET Q5 is connected to the fourth power path S4. A source of the FET Q5 is connected to the first power path S1. A diode D5 which is connected in parallel between the source and the drain of the FET Q5 is a parasitic diode of the FET Q5. An anode of the diode D5 is connected to the first power path S1. A cathode of the diode D5 is connected to the fourth power path S4. Thus, the diode D5 allows current to flow from the first power path S1 toward the fourth power path S4. The FET Q5 is an example of a "fifth switching element" in one or more embodiments of the disclosure.

The FET Q6 is disposed on the fourth power path S4 at a position between the connection point Py and the connection point Px. A drain of the FET Q6 is connected to the second power path S2. A source of the FET Q6 is connected to the fifth power path S5 and the third connection terminal N3. A diode D6 which is connected in parallel between the source and the drain of the FET Q6 is a parasitic diode of the FET Q6. An anode of the diode D6 is connected to the fifth power path S5 and the third connection terminal N3. A cathode of the diode D6 is connected to the second power path S2. Thus, the diode D6 allows current to flow from the fifth power path S5 or the third connection terminal N3 toward the second power path S2. The FET Q6 is an example of a "sixth switching element" in one or more embodiments of the disclosure.

The first DC-DC converter 1 includes a FET Q1, a FET Q2, a choke coil L1, a capacitor C1, and a capacitor C2.

The FET Q1 includes an N-channel MOSFET. The FET Q2 includes an N-channel MOSFET. The FET Q1 and the FET Q2 are connected in series in the same direction between the ground and the second input/output terminal T2. Specifically, a source of the FET Q1 is connected to the ground. A drain of the FET Q1 is connected to a source of the FET Q2. A drain of the FET Q2 is connected to the second input/output terminal T2. The FET Q1 is an example of a "first switching element" in one or more embodiments of the disclosure. The FET Q2 is an example of a "second switching element" in one or more embodiments of the disclosure.

A diode D1 which is connected in parallel between the source and the drain of the FET Q1 is a parasitic diode of the FET Q1. A diode D2 which is connected in parallel between the source and the drain of the FET Q2 is a parasitic diode of the FET Q2. An anode of the diode D1 is connected to the ground. A cathode of the diode D1 is connected to an anode of the diode D2. A cathode of the diode D2 is connected to the second input/output terminal T2. Thus, the diode D1 and the diode D2 allow current to flow toward the second input/output terminal T2.

One end of the choke coil L1 is connected between the FET Q1 and the FET Q2. The other end of the choke coil L1 is connected to the first input/output terminal T1. The choke coil L1 is an example of a "first choke coil" in one or more embodiments of the disclosure.

One end of the capacitor C1 is connected between the first input/output terminal T1 and the choke coil L1. The other end of the capacitor C1 is connected to the ground. One end of the capacitor C2 is connected between the second input/output terminal T2 and the FET Q2. The other end of the capacitor C2 is connected to the ground. The capacitor C1 is an example of a "first capacitor" in one or more embodiments of the disclosure. The capacitor C2 is an example of a "second capacitor" in one or more embodiments of the disclosure.

The second DC-DC converter 2 includes a FET Q3, a FET Q4, a choke coil L2, a capacitor C3, and a capacitor C4.

The FET Q3 includes an N-channel MOSFET. The FET Q4 includes an N-channel MOSFET. The FET Q3 and the FET Q4 are connected in series in the same direction between the ground and the third input/output terminal T3. Specifically, a source of the FET Q3 is connected to the ground. A drain of the FET Q3 is connected to a source of the FET Q4. A drain of the FET Q4 is connected to the third input/output terminal T3. The FET Q3 is an example of a "third switching element" in one or more embodiments of the disclosure. The FET Q4 is an example of a "fourth switching element" in one or more embodiments of the disclosure.

A diode D3 which is connected in parallel between the source and the drain of the FET Q3 is a parasitic diode of the FET Q3. A diode D4 which is connected in parallel between the source and the drain of the FET Q4 is a parasitic diode of the FET Q4. An anode of the diode D3 is connected to the ground. A cathode of the diode D3 is connected to an anode of the diode D4. A cathode of the diode D4 is connected to the third input/output terminal T3. Thus, the diode D3 and the diode D4 allow current to flow toward the third input/output terminal T3.

One end of the choke coil L2 is connected between the FET Q3 and the FET Q4. The other end of the choke coil L2 is connected to the fourth input/output terminal T4. The choke coil L2 is an example of a "second choke coil" in one or more embodiments of the disclosure.

One end of the capacitor C3 is connected between the fourth input/output terminal T4 and the choke coil L2. The other end of the capacitor C3 is connected to the ground. One end of the capacitor C4 is connected between the third input/output terminal T3 and the FET Q4. The other end of the capacitor C4 is connected to the ground. The capacitor C3 is an example of a "third capacitor" in one or more embodiments of the disclosure. The capacitor C4 is an example of a "fourth capacitor" in one or more embodiments of the disclosure.

A constituent circuit of the first DC-DC converter 1 and a constituent circuit of the second DC-DC converter 2 are symmetric with respect to the connection point Px between the second power path S2 and the fourth power path S4.

The controller 10 includes a CPU and a memory. The controller 10 controls the operation of the first DC-DC converter 1 and the operation of the second DC-DC converter 2. Specifically, gates (not illustrated, the same applies to the other drawings) of the FETs Q1 and Q2 of the first DC-DC converter 1 and the FETs Q3 and Q4 of the second DC-DC converter 2 are connected to the controller 10. The controller 10 inputs a drive signal to the gate of each of the FETs Q1, Q2, Q3, and Q4 to turn on or off each of the FETs Q1, Q2, Q3, and Q4. Accordingly, the first DC-DC converter 1 and the second DC-DC converter 2 are brought into an energized state or a nonenergized state. The controller 10 controls a switching operation for turning on or off each of the FETs Q1, Q2, Q3, and Q4 by pulse width modulation (PWM). In this manner, the voltage is raised or lowered in the first DC-DC converter 1 and the second DC-DC converter 2.

In the first DC-DC converter 1, a voltage input through the first input/output terminal T1 can be raised by the switching operation of the FETs Q1 and Q2 to output through the second input/output terminal T2. Further, a voltage input through the second input/output terminal T2 can be lowered by the switching operation of the FETs Q1 and Q2 to output through the first input/output terminal T1. Further, turning on the FET Q2 brings a bidirectionally energized state.

In the second DC-DC converter 2, a voltage input through the third input/output terminal T3 can be lowered by the switching operation of the FETs Q3 and Q4 to output through the fourth input/output terminal T4. Further, a voltage input through the fourth input/output terminal T4 can be raised by the switching operation of the FETs Q3 and Q4 to output through the third input/output terminal T3. Further, turning on the FET Q4 brings a bidirectionally energized state.

The controller 10 also controls on and off operations of the FETs Q5 and Q6. Specifically, gates (not illustrated, the same applies to the other drawings) of the FETs Q5 and Q6 are connected to the controller 10. The controller 10 inputs a drive signal to the gate of each of the FETs Q5 and Q6 to turn on or off each of the FETs Q5 and Q6. Accordingly, the fourth power path S4 or the fifth power path S5 is brought into an energized state or a nonenergized state.

The controller 10 and the host ECU 7 communicate with each other. In particular, the controller 10 receives information indicating a state of the vehicle or an operation instruction from the host ECU 7. FIG. 1 does not illustrate control system wiring and communication system wiring in the voltage conversion apparatus 100 (the same applies to the other drawings).

The current detector 15 is disposed between the connection point Px on the second power path S2 and the second input/output terminal T2 of the first DC-DC converter 1. The current detector 15 detects a current flowing through the second power path S2 and a current flowing from the second DC-DC converter 2 to the first DC-DC converter 1. The controller 10 limits a current flowing to the first DC-DC converter 1 on the basis of a value detected by the current detector 15 when the starter motor 4a is in operation.

The voltage detector 14 detects the voltage of the capacitor 11. The controller 10 calculates a charged amount of the capacitor 11 and controls the operations of the first DC-DC converter 1, the second DC-DC converter 2, and the FETs Q5 and Q6 on the basis of a voltage detected by the voltage detector 14.

Next, the operation of the voltage conversion apparatus 100 will be described with reference to FIGS. 2 to 10.

When the IG-SW 8 is in an off state, the vehicle is in a stopped state, and the regenerative system 200 is in a standby state. In this case, it is necessary to feed current to the host ECU 7, the load 5, and the protected load 6 so as to operate the host ECU 7, the load 5, and the protected load 6. Thus, as indicated by arrows in FIG. 2, power of the battery 12 is supplied to the load 5, the host ECU 7, and the voltage conversion apparatus 100.

In the standby, in the voltage conversion apparatus 100, the first DC-DC converter 1 and the second DC-DC converter 2 are in a stopped state (the FETs Q1 to Q4 are in an off state) and the FETs Q5 and Q6 are also in an off state. Thus, the power supplied from the battery 12 to the first connection terminal N1 of the voltage conversion apparatus 100 is supplied to the protected load 6 through the first power path S1, the fifth power path S5, the diode D5 of the FET Q5, the fourth power path S4, and the third connection terminal N3.

Then, when the IG-SW 8 is turned on by an operation by a driver, the starter motor 4a is initially started for initially starting the engine. At this time, as indicated by an arrow in FIG. 3, the starter motor 4a is started by the power of the battery 12. In the voltage conversion apparatus 100, the controller 10 stops the first DC-DC converter 1 and the second DC-DC converter 2 (turns off the FETs Q1 to Q4), turns off the FET Q6, and turns on the FET Q5. Accordingly, the power of the battery 12 is supplied to the protected load 6 through the first connection terminal N1, the first power path S1, the fifth power path S5, the FET Q5, the fourth power path S4, and the third connection terminal N3.

When the vehicle performs initial running by an operation by a driver after the start of the engine, the generator 13 generates power. The power generated by the generator 13 is supplied to the load 5, the host ECU 7, and the voltage conversion apparatus 100 as indicated by arrows in FIG. 4.

In the initial running, in the voltage conversion apparatus 100, the controller 10 stops the first DC-DC converter 1 and the second DC-DC converter 2 (turns off the FETs Q1 to Q4), turns off the FET Q6, and turns on the FET Q5. Thus, the power from the generator 13 is supplied to the protected load 6 through the first connection terminal N1, the first power path S1, the fifth power path S5, the FET Q5, the fourth power path S4, and the third connection terminal N3.

When a driver, for example, releases an accelerator pedal or presses on a brake pedal to decelerate the vehicle during running of the vehicle, the generator 13 generates regenerated power. The regenerated power is supplied from the generator 13 to the load 5, the host ECU 7, the battery 12, and the voltage conversion apparatus 100 as indicated by arrows in FIG. 5. At this time, when the voltage of the battery 12 is in a reduced state, the battery 12 is charged with the regenerated power (not illustrated).

When the regenerated power is generated, the controller 10 turns on the FET Q5 and the turns off the FET Q6 in the voltage conversion apparatus 100. Accordingly, the regenerated power is supplied to the protected load 6 through the first connection terminal N1, the first power path S1, the fifth power path S5, the FET Q5, the fourth power path S4, and the third connection terminal N3.

Further, the controller 10 operates the first DC-DC converter 1 and the second DC-DC converter 2 to convert the voltage of the regenerated power input through the first connection terminal N1 and the first power path S1 to a voltage corresponding to the capacitor 11 and outputs the power to the capacitor 11 through the second connection terminal N2.

Specifically, for example, the controller 10 allows the FETs Q1 and Q2 of the first DC-DC converter 1 to perform a switching operation (SW), keeps the FET Q3 of the second DC-DC converter 2 turned off, and keeps the FET Q4 of the second DC-DC converter 2 turned on. Accordingly, the voltage of the regenerated power input through the first connection terminal N1 and the first power path S1 is raised by the first DC-DC converter 1. Then, the converted regenerated power is output to the capacitor 11 through the second connection terminal N2 after passing through the first DC-DC converter 1, the second power path S2, the FET Q4 and the choke coil L2 of the second DC-DC converter 2, and the third power path S3.

Alternatively, the controller 10 keeps the FET Q1 of the first DC-DC converter 1 turned off, keeps the FET Q2 of the first DC-DC converter 1 turned on, and allows the FETs Q3 and Q4 of the second DC-DC converter 2 to perform a switching operation. Accordingly, the voltage of the regenerated power input through the first connection terminal N1 and the first power path S1 is input to the second DC-DC converter 2 after passing through the choke coil L1 and the FET Q2 of the first DC-DC converter 1 and the second power path S2. Then, the voltage of the regenerated power is lowered by the second DC-DC converter 2. Then, the converted power is output to the capacitor 11 through the second connection terminal N2 after passing through the second DC-DC converter 2 and the third power path S3.

The capacitor 11 is charged with the power output through the second connection terminal N2. That is, the regenerated power is stored in the capacitor 11.

When the vehicle is in a state other than idling stop and the generator 13 generates no power, the starter motor 4a is also not started. This occurs, for example, when the voltage of the battery 12 and the voltage of the capacitor 11 are sufficiently high. When the generator 13 generates no power and the starter motor 4a is not in operation in this manner, the power of the battery 12 is supplied to the load 5, the host ECU 7, and the voltage conversion apparatus 100 as indicated by arrows in FIG. 6.

Figure 6:
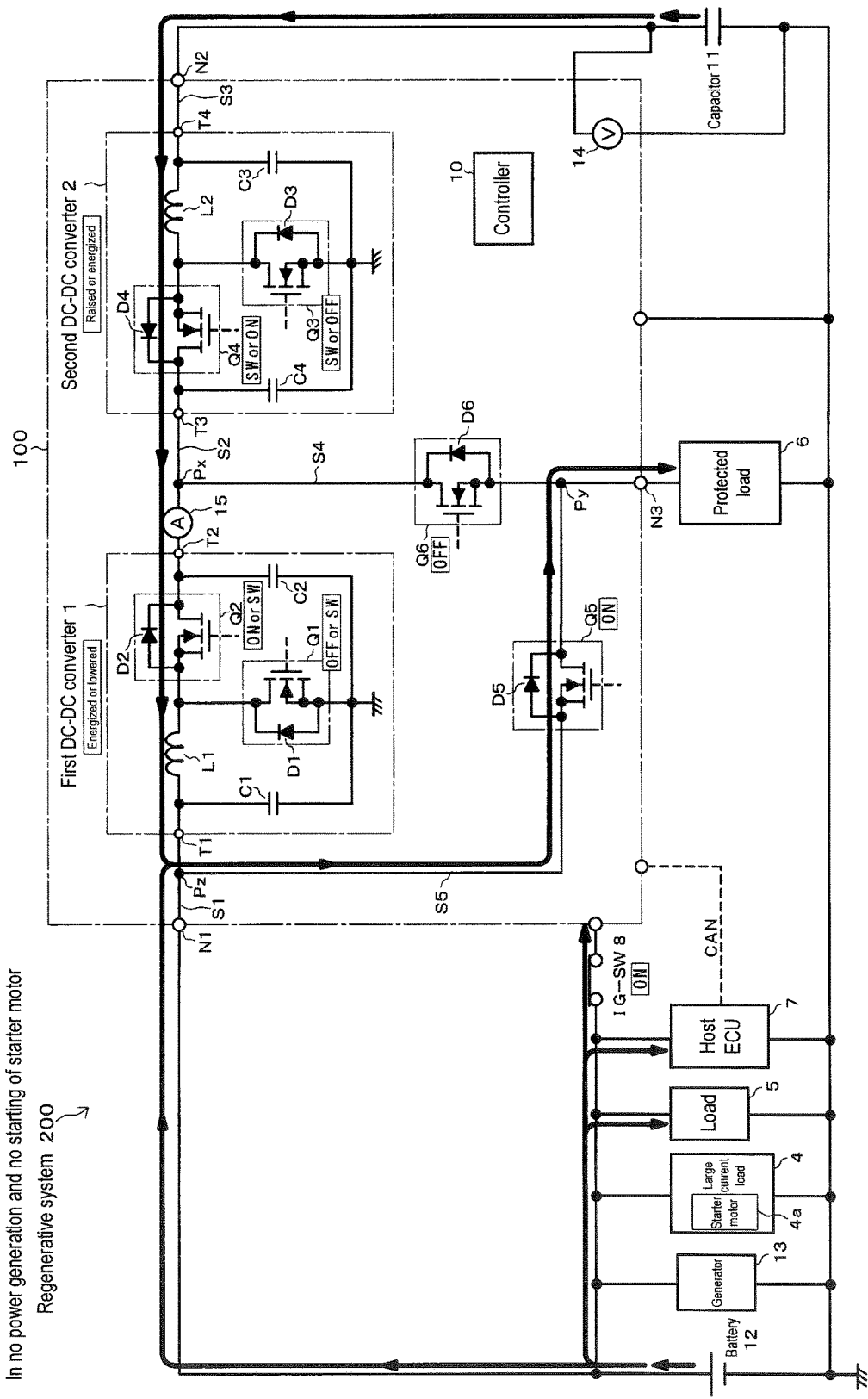
FIG. 6 is a diagram illustrating an operation of the circuit of FIG. 1 when no power is generated and the starter motor is not started.

At this time, in the voltage conversion apparatus 100, the controller 10 turns on the FET Q5 and turns off the FET Q6 as illustrated in FIG. 6. Accordingly, the power from the battery 12 is supplied to the protected load 6 through the first connection terminal N1, the first power path S1, the fifth power path S5, the FET Q5, the fourth power path S4, and the third connection terminal N3.

The controller 10 operates the first DC-DC converter 1 and the second DC-DC converter 2 to convert a voltage input from the capacitor 11 through the second connection terminal N2 and the third power path S3 to a voltage corresponding to the protected load 6 by the first DC-DC converter 1 and the second DC-DC converter 2 and to output the power to the first power path S1.

Specifically, for example, the controller 10 allows the FETs Q3 and Q4 of the second DC-DC converter 2 to perform a switching operation, keeps the FET Q1 of the first DC-DC converter 1 turned off, and keeps the FET Q2 of the first DC-DC converter 1 turned on. Accordingly, the voltage input from the capacitor 11 through the second connection terminal N2 and the third power path S3 is raised by the second DC-DC converter 2. Then, the converted power is output from the second DC-DC converter 2 to the first power path S1 through the second power path S2, and the FET Q2 and the choke coil L1 of the first DC-DC converter 1.

Alternatively, the controller 10 keeps the FET Q3 of the second DC-DC converter 2 turned off, keeps the FET Q4 of the second DC-DC converter 2 turned on, and allows the FETs Q1 and Q2 of the first DC-DC converter 1 to perform a switching operation. Accordingly, the voltage input from the capacitor 11 through the second connection terminal N2 and the third power path S3 is input to the first DC-DC converter 1 through the choke coil L2 and the FET Q4 of the second DC-DC converter 2 and the second power path S2. Then, the voltage from the capacitor 11 is lowered by the first DC-DC converter 1. Then, the converted power is output from the first DC-DC converter 1 to the first power path S1.

As described above, the power of the capacitor 11 output from the first DC-DC converter 1 to the first power path S1 is supplied to the protected load 6 through the fifth power path S5, the FET Q5, the fourth power path S4, and the third connection terminal N3. Accordingly, the capacitor 11 is discharged.

When the vehicle comes into an extremely low-speed running state or a stopped state and a predetermined idling stop shift condition is satisfied, idling stop is started. As the idling stop shift condition in this case, for example, a power that can be supplied to the protected load 6 remains in the capacitor 11 or the battery 12 at the time of restarting the engine. The host ECU 7 determines the satisfaction of the idling stop shift condition and controls idling stop. During idling stop, the generator 13 generates no power and no regenerated power.

Then, when the idling stop is finished and the starter motor 4a is started for restarting the engine, the controller 10 allows the voltage detector 14 to detect the voltage of the capacitor 11. At this time, when the voltage of the capacitor 11 detected by the voltage detector 14 is a predetermined value (a value larger than a voltage required to drive the protected load 6) or more, the controller 10 operates the first DC-DC converter 1 and the second DC-DC converter 2, turns off the FET Q5, and turns on the FET Q6 as illustrated in FIG. 7.

Specifically, for example, the controller 10 allows the FETs Q3 and Q4 of the second DC-DC converter 2 to perform a switching operation. Accordingly, the voltage from the capacitor 11 is raised corresponding to the protected load 6 by the second DC-DC converter 2 after passing through the second connection terminal N2 and the third power path S3. Then, the converted power is supplied from the second DC-DC converter 2 to the protected load 6 through the second power path S2, the fourth power path S4, the FET Q6, and the third connection terminal N3.

Alternatively, the controller 10 keeps the FET Q3 of the second DC-DC converter 2 turned off and keeps the FET Q4 of the second DC-DC converter 2 turned on. Accordingly, as indicated by arrows in FIG. 7, the power from the capacitor 11 is supplied to the protected load 6 through the second connection terminal N2, the third power path S3, the FET Q4 of the second DC-DC converter 2, the second power path S2, the fourth power path S4, the FET Q6, and the third connection terminal N3.

Figure 7:
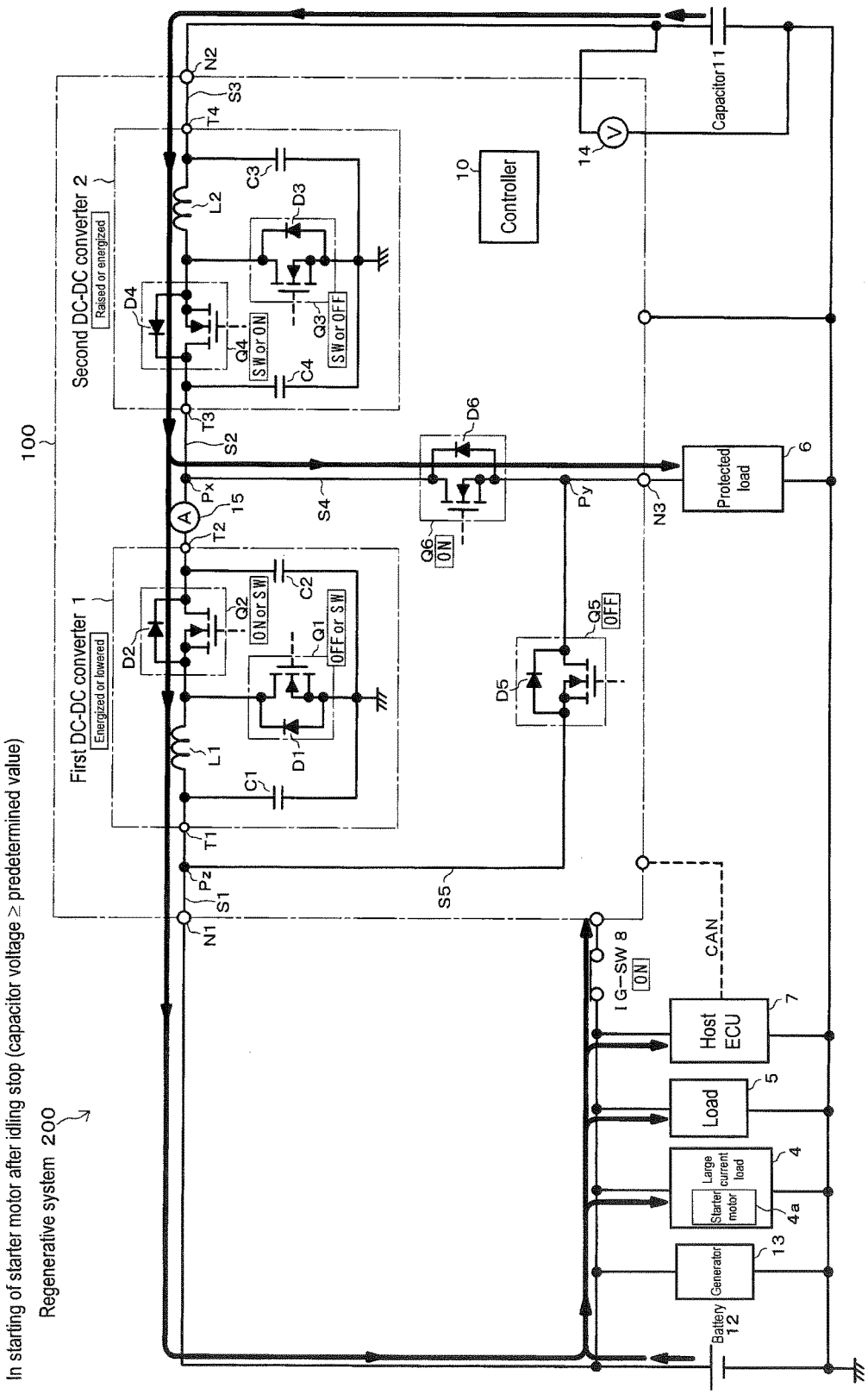
FIG. 7 is a diagram illustrating an operation of the circuit of FIG. 1 when the voltage of a capacitor is a predetermined value or more in starting of the starter motor after idling stop.

Further, as indicated by arrows in FIG. 7, the power from the capacitor 11 is input to the first DC-DC converter 1 through the second connection terminal N2, the third power path S3, the second DC-DC converter 2, and the second power path S2.

At this time, the controller 10 keeps the FET Q1 of the first DC-DC converter 1 turned off and keeps the FET Q2 of the first DC-DC converter 1 turned on. Accordingly, the power input from the second DC-DC converter 2 to the first DC-DC converter 1 is supplied to the starter motor 4a, the large current load 4, and the load 5 through the FET Q2 of the first DC-DC converter 1, the first power path S1, and the first connection terminal N1.

Alternatively, the controller 10 allows the FETs Q1 and Q2 of the first DC-DC converter 1 to perform a switching operation. Accordingly, the voltage input from the second DC-DC converter 2 to the first DC-DC converter 1 is lowered corresponding to the starter motor 4a, the large current load 4, and the load 5 by the first DC-DC converter 1. Then, the converted power is supplied from the first DC-DC converter 1 to the starter motor 4a, the large current load 4, and the load 5 through the first power path S1 and the first connection terminal N1.

As described above, when the charged amount of the capacitor 11 is large, the power from the capacitor 11 is supplied not only to the protected load 6, but also to the starter motor 4a, the large current load 4, and the load 5.

Further, the controller 10 allows the current detector 15 to detect a current flowing from the second DC-DC converter 2 to the first DC-DC converter 1 when the power from the capacitor 11 is supplied to the large current load 4 and the load 5. Then, the controller 10 limits the current flowing to the first DC-DC converter 1 to a specified value that constitutes no obstacle to the drive of the protected load 6 or less on the basis of a value (current value) detected by the current detector 15.

Specifically, the controller 10 controls the on-duty of a PWM signal for allowing the FETs Q1 and Q2 of the first DC-DC converter 1 or the FETs Q3 and Q4 of the second DC-DC converter 2 to perform a switching operation so that the value detected by the current detector 15 becomes the specified value or less. Accordingly, even when a current flows from the capacitor 11 to the starter motor 4a during the operation of the starter motor 4a (excepting the initial start), the voltage supplied from the capacitor 11 to the protected load 6 is not reduced such an extent as to constitute an obstacle to the drive of the protected load 6, which keeps stable driving of the protected load 6.

Figure 8:
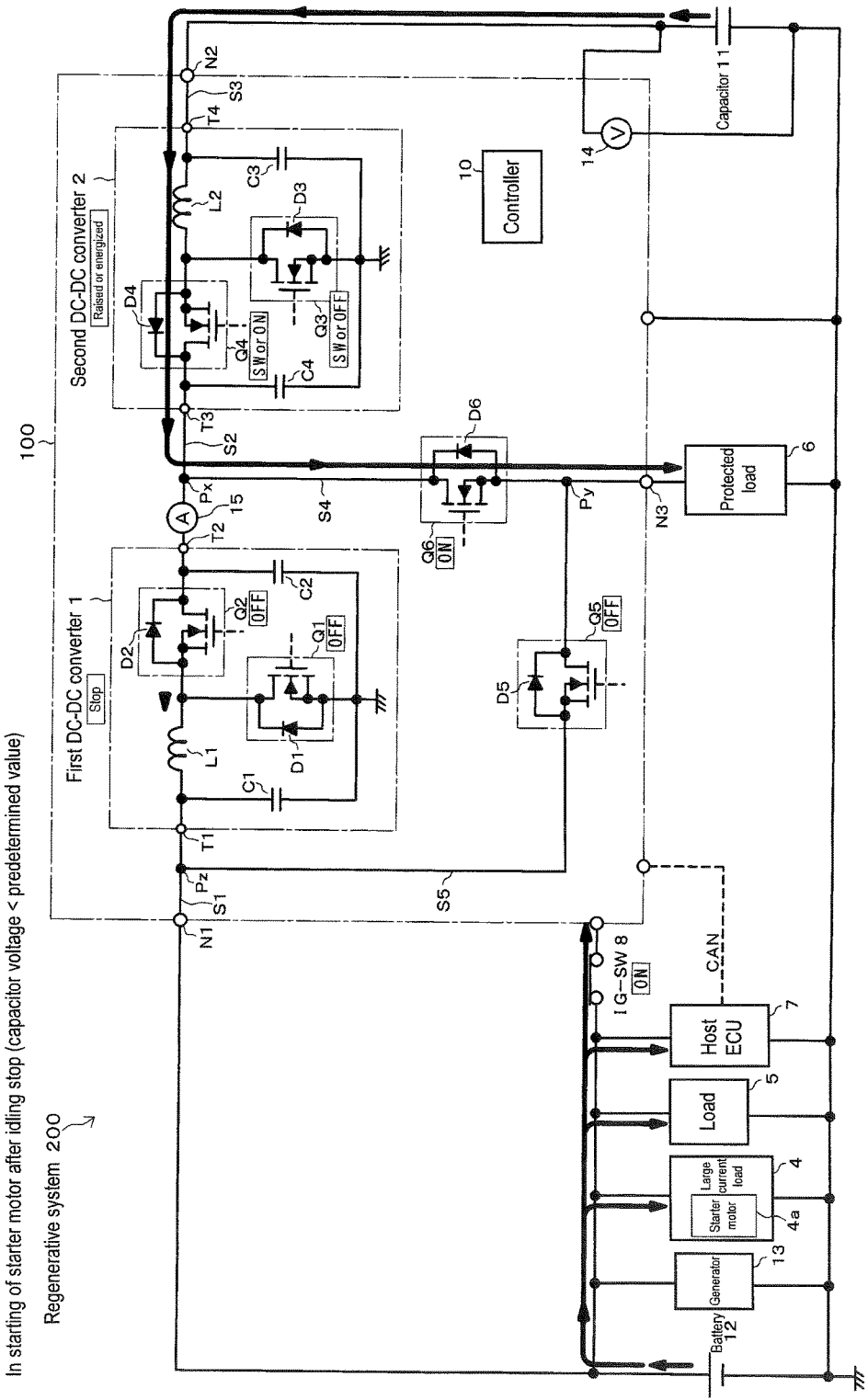
FIG. 8 is a diagram illustrating an operation of the circuit of FIG. 1 when the voltage of the capacitor is less than the predetermined value in starting of the starter motor after idling stop.

On the other hand, when the voltage of the capacitor 11 detected by the voltage detector 14 is less than a predetermined value at the time of starting the starter motor 4a after idling stop, the controller 10 operates the second DC-DC converter 2, stops the first DC-DC converter 1, turns off the FET Q5, and turns on the FET Q6 as illustrated in FIG. 8.

At this time, for example, the controller 10 allows the FETs Q3 and Q4 of the second DC-DC converter 2 to perform a switching operation. Accordingly, the voltage from the capacitor 11 is raised corresponding to the protected load 6 by the second DC-DC converter 2 after passing through the second connection terminal N2 and the third power path S3. Then, the converted power is supplied from the second DC-DC converter 2 to the protected load 6 through the second power path S2, the fourth power path S4, the FET Q6, and the third connection terminal N3.

Alternatively, the controller 10 keeps the FET Q3 of the second DC-DC converter 2 turned off and keeps the FET Q4 of the second DC-DC converter 2 turned on. Accordingly, as indicated by arrows in FIG. 8, the power from the capacitor 11 is supplied to the protected load 6 through the second connection terminal N2, the third power path S3, the FET Q4 of the second DC-DC converter 2, the second power path S2, the fourth power path S4, the FET Q6, and the third connection terminal N3.

Since the first DC-DC converter 1 is in a stopped state (the FETs Q1 and Q2 are in an off state) and the FET Q5 is in an off state, the capacitor 11 is electrically separated from the protected load 6 and the battery 12. Thus, even when a current flows from the battery 12 to the starter motor 4a at the time of starting the starter motor 4a, the voltage supplied from the capacitor 11 to the protected load 6 is not reduced, which keeps stable driving of the protected load 6.

As illustrated in FIGS. 7 and 8, the power of the capacitor 11 may be supplied to the large current load 4, the load 5, and the protected load 6 also during idling stop of the vehicle on the basis of a result of the comparison between the voltage of the capacitor 11 and the predetermined value.

Figure 9:
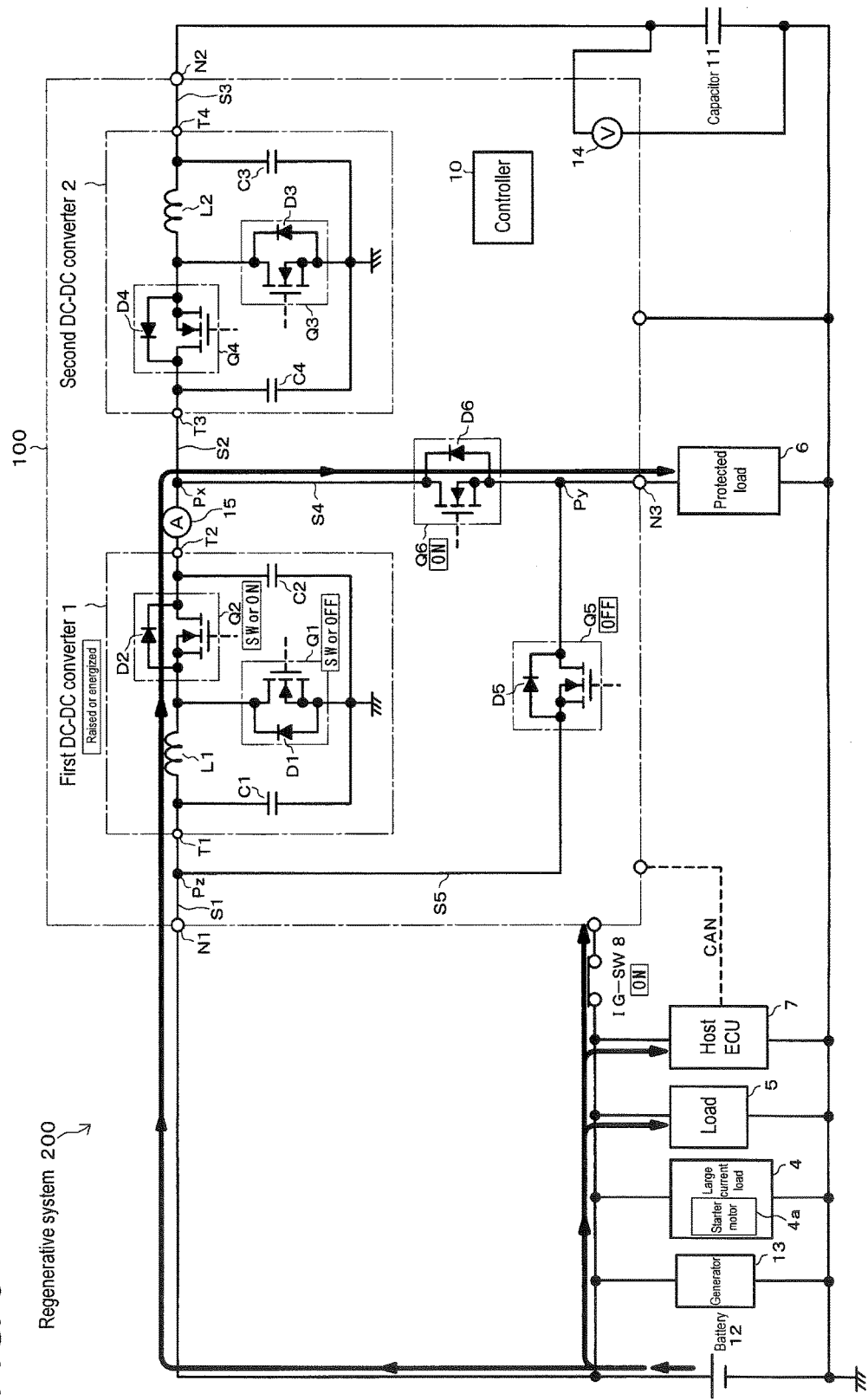
FIG. 9 is a diagram illustrating another operation of the circuit of FIG. 1.

The power of the battery 12 may be supplied to the protected load 6 through the first connection terminal N1, the first DC-DC converter 1, the second power path S2, the fourth power path S4, the FET Q6, and the third connection terminal N3 as indicated by arrows in FIG. 9.

In FIG. 9, the controller 10 allows the FETs Q1 and Q2 of the first DC-DC converter 1 to perform a switching operation, turns off the FET Q5, and turns on the FET Q6. Accordingly, for example, even when the voltage from the battery 12 is lower than a voltage required to drive the protected load 6, the voltage from the battery 12 is raised corresponding to the protected load 6 by the first DC-DC converter 1 after passing through the first connection terminal N1 and the first power path S1. Then, the converted power is supplied from the first DC-DC converter 1 to the protected load 6 through the second power path S2, the fourth power path S4, the FET Q6, and the third connection terminal N3.

Alternatively, the controller 10 may keep the FET Q1 of the first DC-DC converter 1 turned off, keep the FET Q2 of the first DC-DC converter 1 turned on, turn off the FET Q5, and turn on the FET Q6. Accordingly, the power from the battery 12 is supplied to the protected load 6 through the first connection terminal N1, the first power path S1, the first DC-DC converter 1, the second power path S2, the fourth power path S4, the FET Q6, and the third connection terminal N3.

In the above, for example, the FETs Q3 and Q4 may be turned off (refer to FIGS. 2 to 4) in the second DC-DC converter 2. Alternatively, the FET Q3 may be kept turned off and the FET Q4 may be kept turned on. Alternatively, the FETs Q3 and Q4 may be allowed to perform a switching operation (refer to FIG. 6). FIG. 9 does not illustrate the operation and a power supply state in the circuit between the connection point Px and the second DC-DC converter 2.

Figure 10:
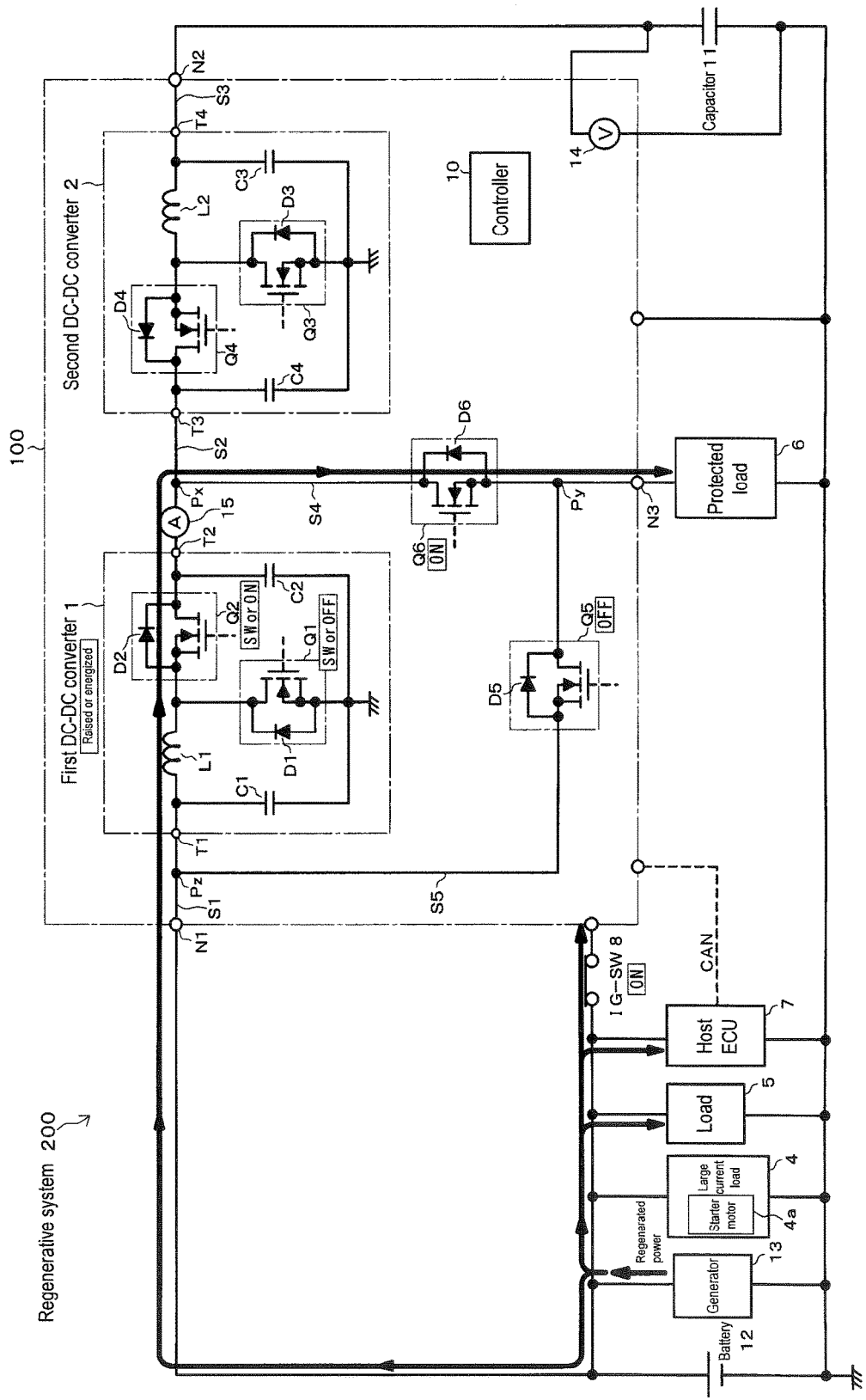
FIG. 10 is a diagram illustrating still another operation of the circuit of FIG. 1.

The regenerated power generated by the generator 13 may be supplied to the protected load 6 through the first connection terminal N1, the first DC-DC converter 1, the second power path S2, the fourth power path S4, the FET Q6, and the third connection terminal N3 as indicated by arrows in FIG. 10.

In FIG. 10, the controller 10 allows the FETs Q1 and Q2 of the first DC-DC converter 1 to perform a switching operation, turns off the FET Q5, and turns on the FET Q6. Accordingly, for example, even when the voltage of the regenerated power is lower than a voltage required to drive the protected load 6, the voltage of the regenerated power is raised corresponding to the protected load 6 by the first DC-DC converter 1 after passing through the first connection terminal N1 and the first power path S1. Then, the converted power is supplied from the first DC-DC converter 1 to the protected load 6 through the second power path S2, the fourth power path S4, the FET Q6, and the third connection terminal N3.

Alternatively, the controller 10 may keep the FET Q1 of the first DC-DC converter 1 turned off, keep the FET Q2 of the first DC-DC converter 1 turned on, turn off the FET Q5, and turn on the FET Q6. Accordingly, the regenerated power is supplied to the protected load 6 through the first connection terminal N1, the first power path S1, the first DC-DC converter 1, the second power path S2, the fourth power path S4, the FET Q6, and the third connection terminal N3.

In the above, for example, the FET Q3 may be kept turned off and the FET Q4 may be kept turned on in the second DC-DC converter 2. Alternatively, the FETs Q3 and Q4 may be allowed to perform a switching operation (refer to FIG. 5). FIG. 10 does not illustrate the operation and a power supply state in the circuit between the connection point Px and the second DC-DC converter 2.

Figure 2:
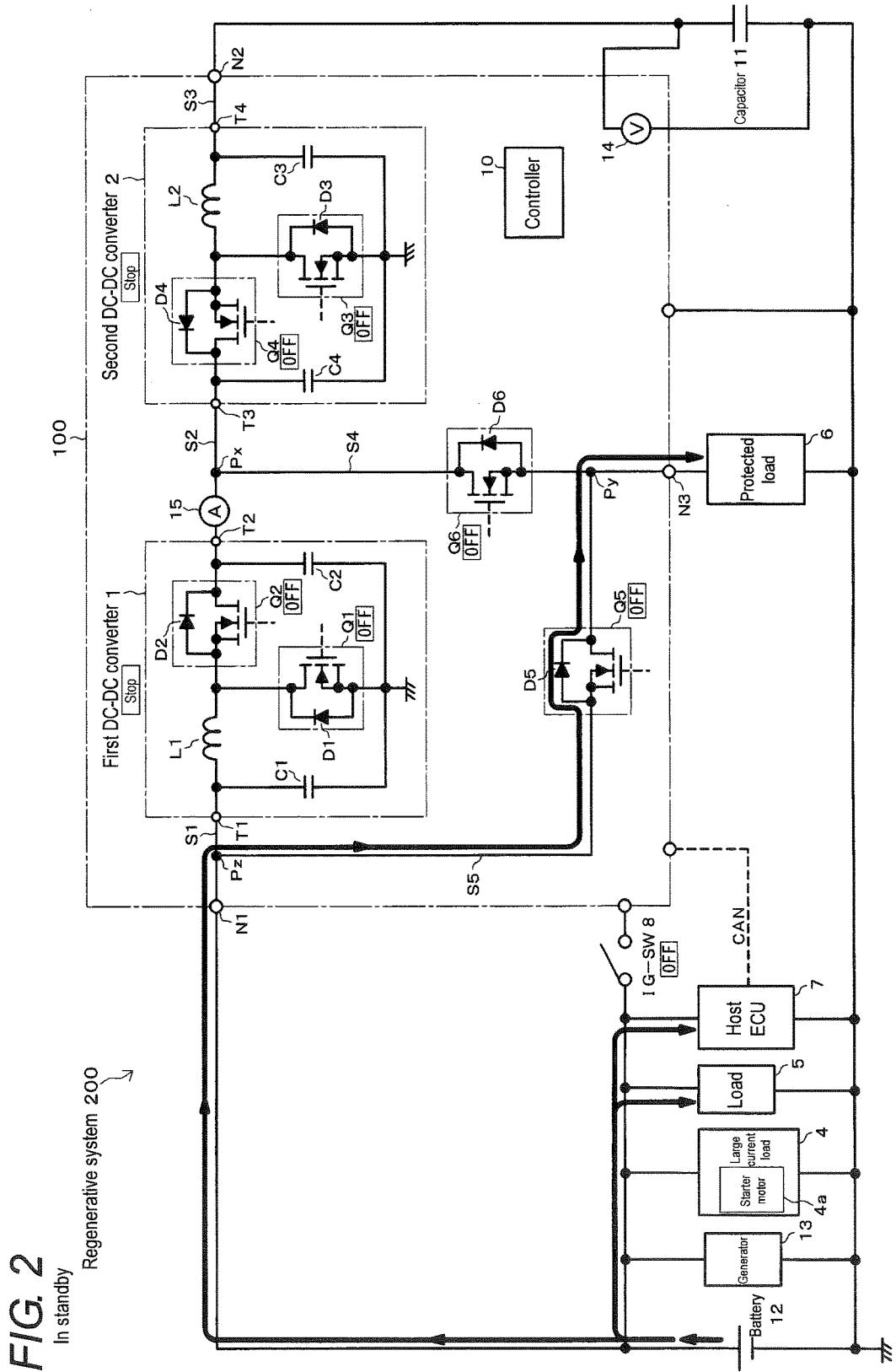
FIG. 2 is a diagram illustrating an operation of a circuit of FIG. 1 in standby.
Figure 3:
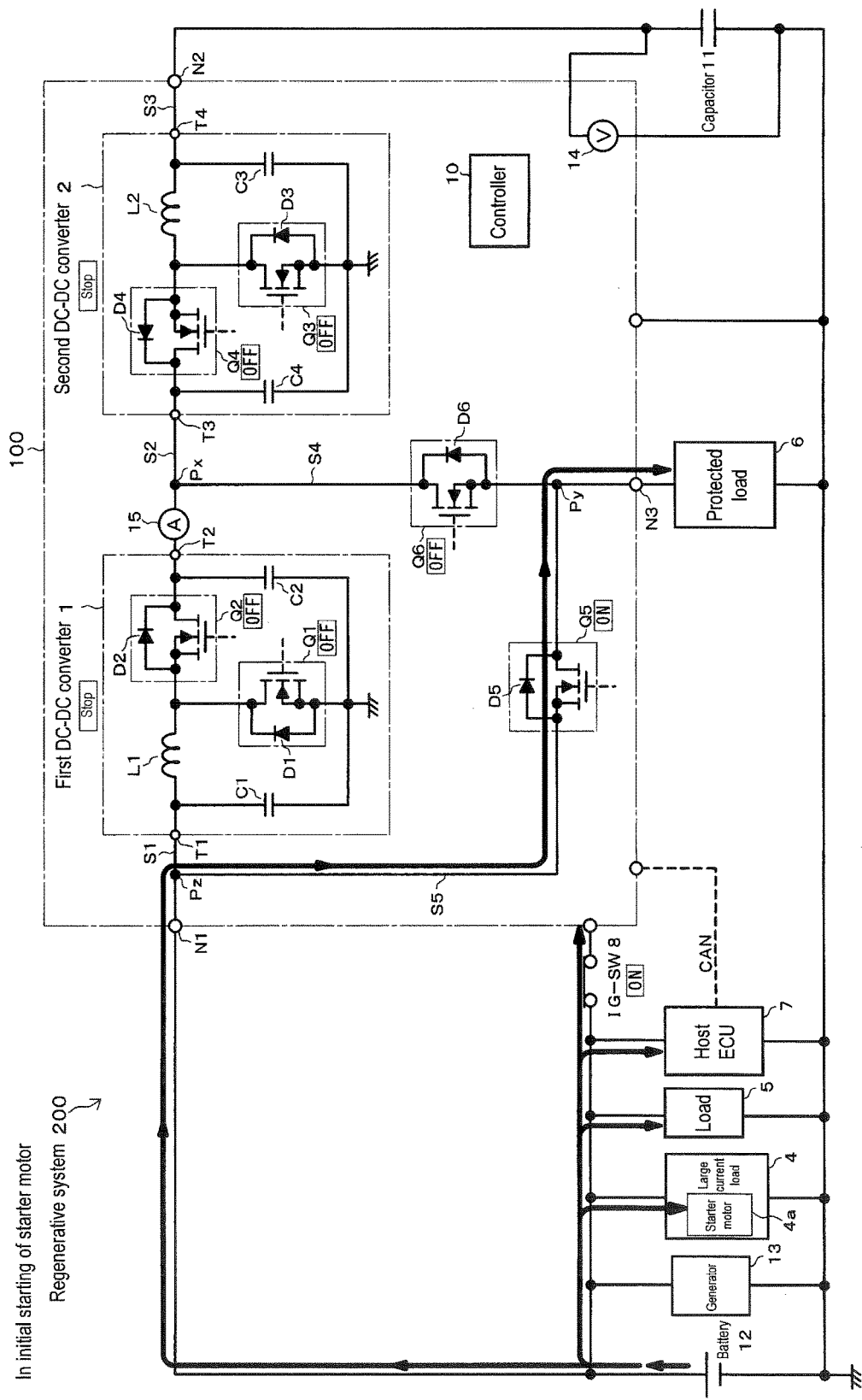
FIG. 3 is a diagram illustrating an operation of the circuit of FIG. 1 in initial starting of a starter motor.
Figure 4:
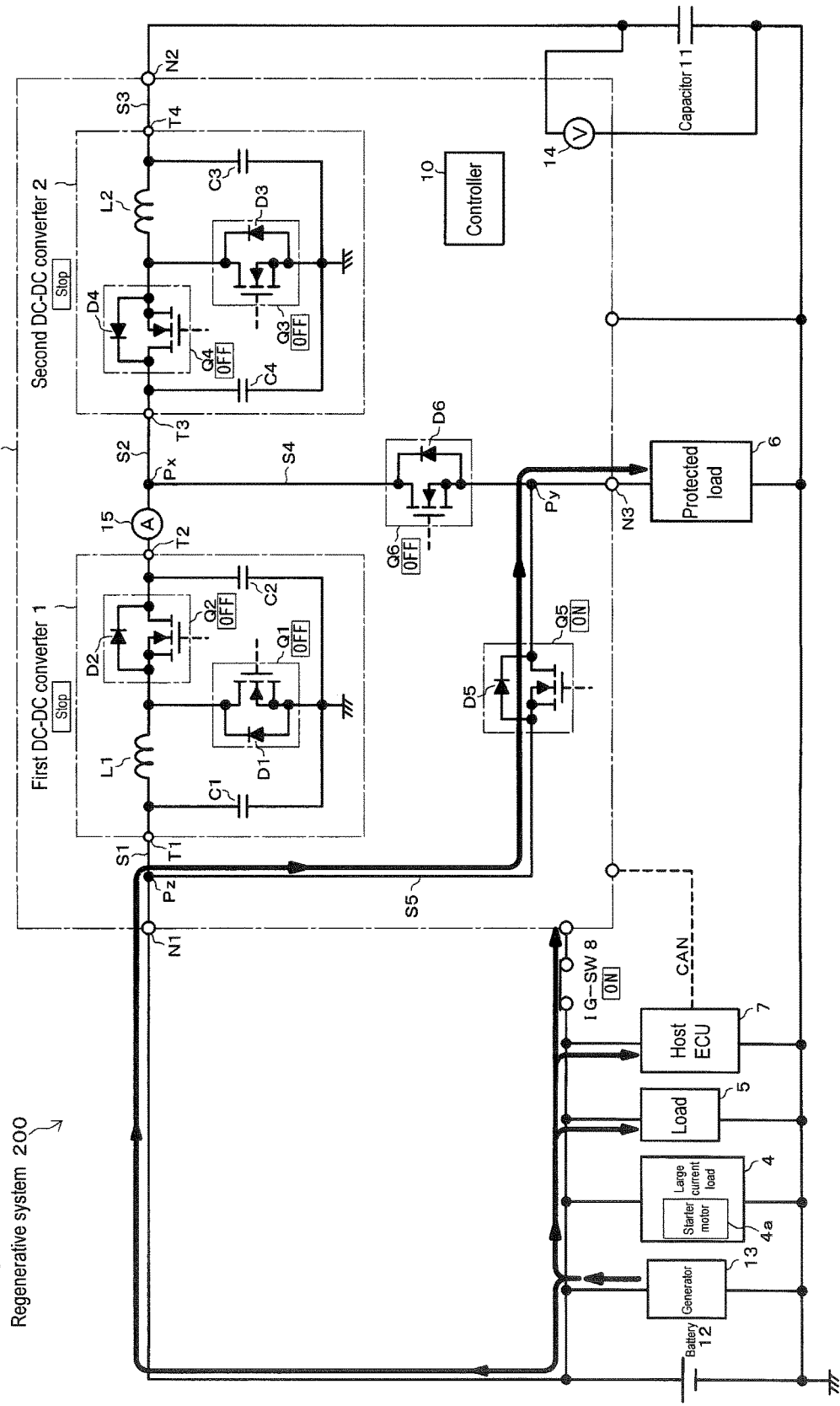
FIG. 4 is a diagram illustrating an operation of the circuit of FIG. 1 in initial running.

An illustrative embodiment makes it possible to supply the power from the battery 12 to the protected load 6 through the first connection terminal N1, the first power path S1, the first DC-DC converter 1, the second power path S2, the fourth power path S4, the FET Q6, and the third connection terminal N3 (FIGS. 2 to 4). In this case, when the voltage of the battery 12 is low, the voltage of the battery 12 can be raised to a voltage corresponding to the protected load 6 by the first DC-DC converter 1.

Figure 5:
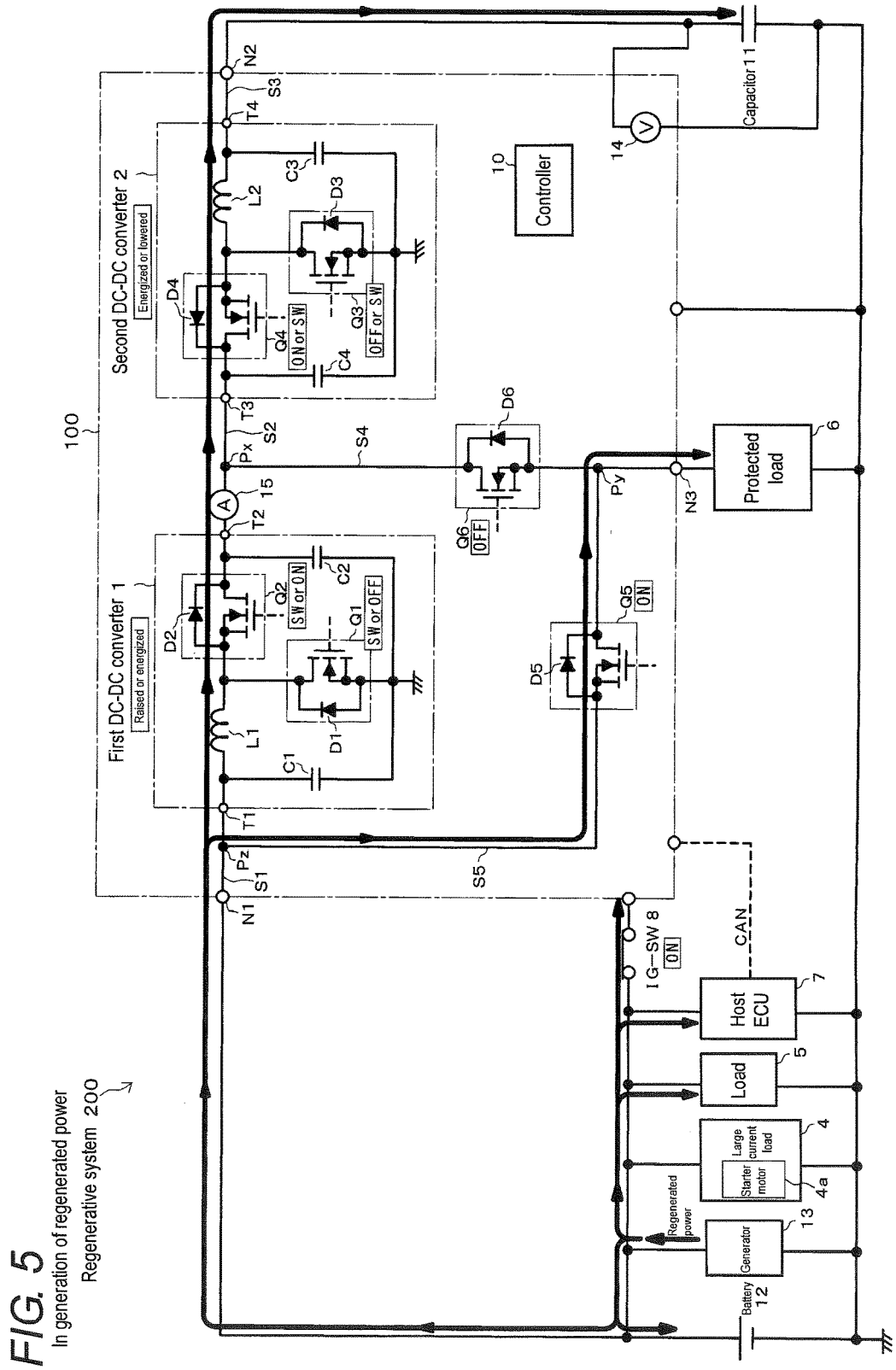
FIG. 5 is a diagram illustrating an operation of the circuit of FIG. 1 in the generation of regenerated power.

Further, it is possible to supply the regenerated power generated by the generator 13 to the capacitor 11 through the first connection terminal N1, the first power path S1, the first DC-DC converter 1, the second power path S2, the second DC-DC converter 2, the third power path S3, and the second connection terminal N2 to charge the capacitor 11 (FIG. 5). In this case, when the voltage of the regenerated power does not correspond to the capacitor 11, the voltage of the regenerated power can be raised corresponding to the capacitor 11 by the first DC-DC converter 1 or lowered corresponding to the capacitor 11 by the second DC-DC converter 2.

Further, during the operation of the starter motor 4a after idling stop, it is possible to supply the power from the capacitor 11 to the protected load 6 through the second connection terminal N2, the third power path S3, the second DC-DC converter 2, the second power path S2, the fourth power path S4, the FET Q6, and the third connection terminal N3 (FIGS. 7 and 8). In this case, when the voltage of the capacitor 11 is low, the voltage of the capacitor 11 can be raised to a voltage corresponding to the protected load 6 by the second DC-DC converter 2.

Further, when the voltage of the capacitor 11 is high (a predetermined value or more) during the operation of the starter motor 4a after idling stop, it is possible to supply the power from the capacitor 11 to the large current load 4 and the load 5 through the second connection terminal N2, the third power path S3, the second DC-DC converter 2, the second power path S2, the first DC-DC converter 1, the first power path S1, and the first connection terminal N1 (FIG. 7). In this case, when the voltage of the capacitor 11 does not correspond to the large current load 4 and the load 5, the voltage of the capacitor 11 can be raised corresponding to the large current load 4 and the load 5 by the second DC-DC converter 2 or lowered corresponding to the large current load 4 and the load 5 by the first DC-DC converter 1.

Further, it is also possible to supply the power of the battery 12 to the protected load 6 through the first connection terminal N1, the first power path S1, the fifth power path S5, the FET Q5, the fourth power path S4, and the third connection terminal N3 (FIG. 6). Further, it is also possible to supply the power of the capacitor 11 to the protected load 6 through the second connection terminal N2, the third power path S3, the second DC-DC converter 2, the second power path S2, the first DC-DC converter 1, the first power path S1, the fifth power path S5, the FET Q5, the fourth power path S4, and the third connection terminal N3 (FIG. 6). In this case, when the voltage of the capacitor 11 does not correspond to the protected load 6, the voltage of the capacitor 11 can be raised corresponding to protected load 6 by the second DC-DC converter 2 or lowered corresponding to the protected load 6 by the first DC-DC converter 1.

Thus, it is possible to stably supply power from the battery 12 and the capacitor 11 to the large current load 4, the load 5, and the protected load 6. Further, it is possible to increase the opportunity of using the power of the battery 12 and the power of the capacitor 11 to effectively use the power of the battery 12 and the power of the capacitor 11. Further, since the regenerated power is stored in the capacitor 11 and then supplied to the large current load 4, the load 5, and the protected load 6, the regenerated power can be effectively used.

In an illustrative embodiment, the FET Q6 is disposed on the fourth power path S4. Thus, the power of the battery 12 or the capacitor 11 can be supplied to the protected load 6 through the fourth power path S4 by turning on the FET Q6. On the other hand, it is possible to prevent the power of the battery 12 or the capacitor 11 or the regenerated power from unintentionally leaking to the fourth power path S4 through the second power path S2 by turning off the FET Q6. Further, when the FET Q6 is in an off state, it is possible to prevent the power of the battery 12 or the regenerated power from unintentionally leaking from the second power path S2 to the third power path S3 through the fifth power path S5, the diode D6 on the fourth power path S4 by the DC-DC converter 2.

In an illustrative embodiment, the FETs Q1 and Q2 are disposed on the first DC-DC converter 1. The FETs Q3 and Q4 are disposed on the second DC-DC converter 2. The FET Q5 and FET Q6 are disposed on the fifth power path S5 and the fourth power path S4, respectively. Thus, the number of switching elements used in the voltage conversion apparatus 100 can be reduced to six.

In an illustrative embodiment, the current flowing to the first DC-DC converter 1 is limited to the specified value that constitutes no obstacle to the drive of the protected load 6 or less on the basis of a value detected by the current detector 15 during the operation of the starter motor 4a after idling stop. Thus, even when the power of the capacitor 11 is supplied to the starter motor 4a, the large current load 4, the load 5, and the protected load 6 during the operation of the starter motor 4a, it is possible to prevent the voltage supplied from the capacitor 11 to the protected load 6 from being reduced such an extent as to constitute an obstacle to the drive of the protected load 6. Thus, it is possible to continuously and stably drive the protected load 6.

In an illustrative embodiment, during the operation of the starter motor 4a after idling stop, the power of the capacitor 11 is supplied to the starter motor 4a, the large current load 4, the load 5, and the protected load 6 when the voltage of the capacitor 11 is a predetermined value or more. On the other hand, the power of the capacitor 11 is supplied only to the protected load 6 when the voltage of the capacitor 11 is less than the predetermined value. Thus, when the remaining power amount of the capacitor 11 is more than enough to drive the protected load 6, it is possible to supply the power of the capacitor 11 to the starter motor 4a, the large current load 4, the load 5, and the protected load 6 to effectively use the power of the capacitor 11. On the other hand, when the remaining power amount of the capacitor 11 is only enough to drive the protected load 6, it is possible to supply the power of the capacitor 11 to the protected load 6 to effectively use the power of the capacitor 11 while stably driving the protected load 6. That is, the regenerated power generated by the generator 13 can be stored in the capacitor 11 and then effectively used.

The one or more embodiments of the disclosure may employ various embodiments other than the above embodiment. For example, in an illustrative embodiment, there has been described an example in which the current detector 15 is disposed between the connection point Px on the second power path S2 and the input/output terminal T2 of the first DC-DC converter 1 to detect the current flowing from the second DC-DC converter 2 to the first DC-DC converter 1. However, one or more embodiments of the disclosure are not limited only thereto. Alternatively, for example, a current detector may be disposed between the connection point Pz (FIG. 1) on the first power path S1 and the input/output terminal T1 of the first DC-DC converter 1 or disposed on a ground line (not illustrated) of the first DC/DC converter 1. Also in such a configuration, it is possible to detect the current flowing from the second DC-DC converter 2 to the first DC-DC converter 1 by the current detector.

Alternatively, a first current detector which detects a current flowing through the second DC-DC converter 2 may be disposed between the connection point Px on the second power path S2 and the second connection terminal N2, and a second current detector which detects a current flowing through the FET Q6 may be disposed between the connection point Py on the fourth power path S4 and the third connection terminal N3. In this case, the current flowing from the second DC-DC converter 2 to the first DC-DC converter 1 can be detected by subtracting a value detected by the second current detector from a value detected by the first current detector.

Alternatively, a current detector may be disposed outside the voltage conversion apparatus 100, for example, on a power path between the battery 12 and the first connection terminal N1. In this case, a value of the current flowing from the second DC-DC converter 2 to the first DC-DC converter 1, the value being detected by the current detector, may be output to the controller 10 of the voltage conversion apparatus 100, for example, through a CAN.

Figure 11:
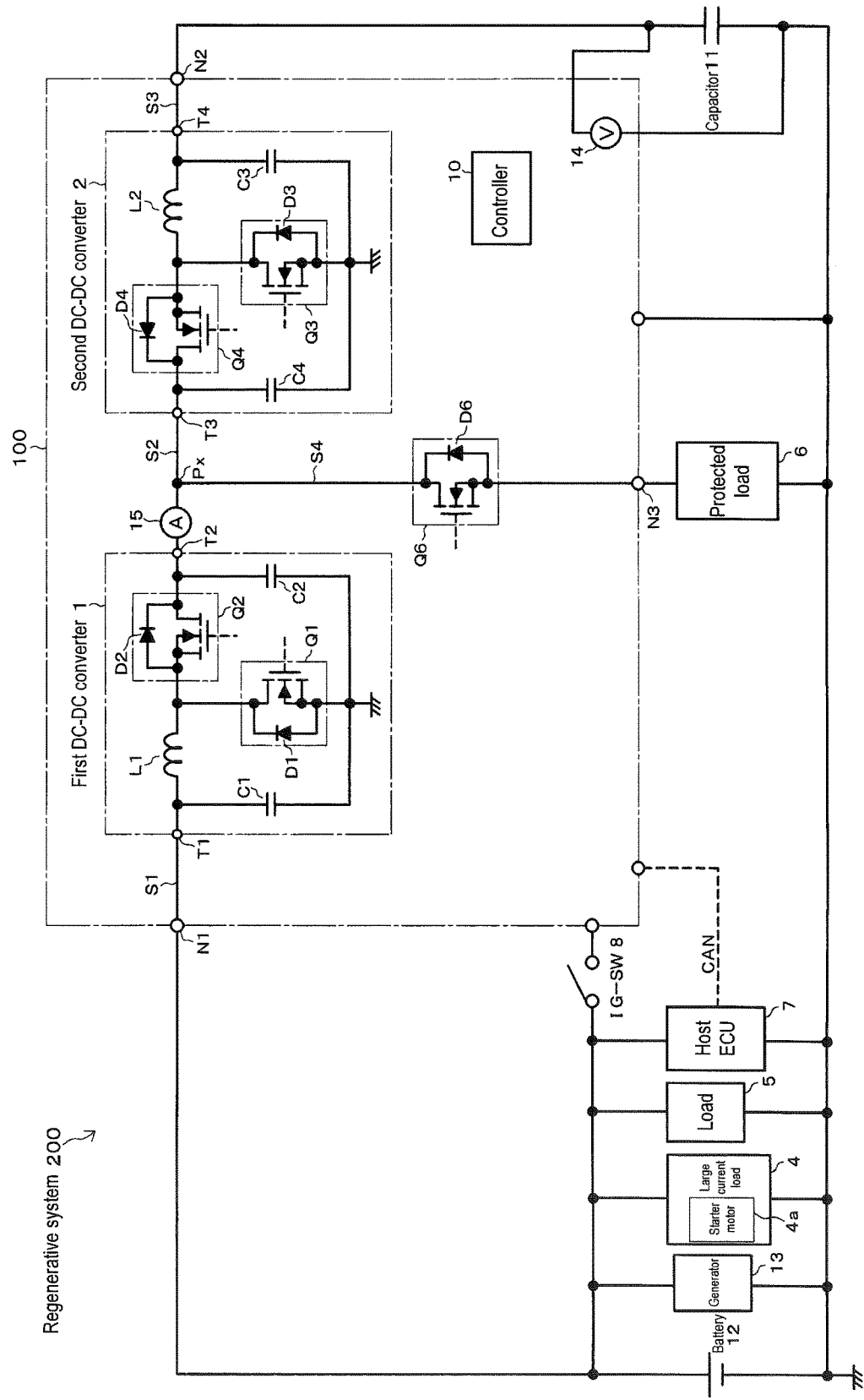
FIG. 11 is a diagram illustrating a circuit configuration of a voltage conversion apparatus one or more embodiments of the disclosure.

In tan illustrative embodiment, there has been described an example in which a bypass circuit that includes the fifth power path S5 and the FET Q5 is connected to the first power path S1 and the fourth power path S4. However, the disclosure is not limited only thereto. Such a bypass circuit may be omitted. FIG. 11 illustrates this example.

In FIG. 11, for example, the first DC-DC converter 1 is operated and the FET Q6 is turned on. Accordingly, the power of the battery 12 or the regenerated power of the generator 13 is supplied to the protected load 6 through the first connection terminal N1, the first power path S1, the first DC-DC converter 1, the second power path S2, the fourth power path S4, the FET Q6, and the third connection terminal N3. In this case, for example, the FET Q1 of the first DC-DC converter 1 may be kept turned off and the FET Q2 of the first DC-DC converter 1 may be kept turned on to supply the power of the battery 12 or the regenerated power to the protected load 6 without voltage conversion. Alternatively, the FETs Q1 and Q2 of the first DC-DC converter 1 may be allowed to perform a switching operation to raise the voltage of the battery 12 or the regenerated power corresponding to the protected load 6 and to supply the converted power to the protected load 6. In the second DC-DC converter 2, both the FETs Q3 and Q4 may be turned off, or only the FET Q4 may be turned on to bring an energized state.

In FIG. 11, for example, the second DC-DC converter 2 is operated and the FET Q6 is turned on. Accordingly, the power of the capacitor 11 is supplied to the protected load 6 through the second connection terminal N2, the third power path S3, the second DC-DC converter 2, the second power path S2, the fourth power path S4, the FET Q6, and the third connection terminal N3. In this case, for example, the FET Q3 of the second DC-DC converter 2 may be kept turned off and the FET Q4 of the second DC-DC converter 2 may be kept turned on to supply the power of capacitor 11 to the protected load 6 without voltage conversion. Alternatively, the FETs Q3 and Q4 of the second DC-DC converter 2 may be allowed to perform a switching operation to raise the voltage of the capacitor 11 corresponding to the protected load 6 and to supply the converted power to the protected load 6. In the first DC-DC converter 1, both the FETs Q1 and Q2 may be turned off, or only the FET Q2 may be turned on to bring an energized state.

In an illustrative embodiment, there has been described an example in which the N-channel MOSFETs Q1 to Q6 are used as the first to sixth switching elements, respectively. However, the one or more embodiments of the disclosure are is not limited only thereto. Alternatively, for example, a P-channel MOSFET may be used. Further, a junction-type FET may be used instead of a MOSFET. Further, other switching elements such as a transistor and a relay may be used.

In an illustrative embodiment, there has been described an example in which the disclosure is applied to the voltage conversion apparatus 100 for a vehicle that has an idling stop function and a deceleration regenerative function. However, the disclosure is not limited only thereto. Alternatively, the disclosure is also applicable to a voltage conversion apparatus for a vehicle that has a deceleration regenerative function, but has no idling stop function or voltage conversion apparatuses for other purposes.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A voltage conversion apparatus to which a first DC power supply, a second DC power supply, and a load are connected, the voltage conversion apparatus configured to convert a voltage of each of the first and second DC power supplies to a voltage of a different magnitude and to supply the converted voltage to the load, the voltage conversion apparatus comprising:
   a first connection terminal to which the first DC power supply is connected;
   a second connection terminal to which the second DC power supply is connected;
   a third connection terminal to which the load is connected;
   a first DC-DC converter having a first input/output terminal and a second input/output terminal;
   a second DC-DC converter having a third input/output terminal and a fourth input/output terminal;

a first power path having one end connected to the first connection terminal and the other end connected to the first input/output terminal;

a second power path having one end connected to the second input/output terminal and the other end connected to the third input/output terminal;

a third power path having one end connected to the fourth input/output terminal and the other end connected to the second connection terminal; and a fourth power path having one end connected to a midway part of the second power path and the other end connected to the third connection terminal.

2. The voltage conversion apparatus according to claim 1, wherein the first DC-DC converter comprises a first switching element and a second switching element connected in series in the same direction between a ground and the second input/output terminal, a first choke coil having one end connected between the first switching element and the second switching element and the other end connected to the first input/output terminal, a first capacitor having one end connected between the first input/output terminal and the first choke coil and the other end connected to the ground, and a second capacitor having one end connected between the second input/output terminal and the second switching element and the other end connected to the ground, and wherein the second DC-DC converter comprises a third switching element and a fourth switching element connected in series in the same direction between a ground and the third input/output terminal, a second choke coil having one end connected between the third switching element and the fourth switching element and the other end connected to the fourth input/output terminal, a third capacitor having one end connected between the fourth input/output terminal and the second choke coil and the other end connected to the ground, and a fourth capacitor having one end connected between the third input/output terminal and the fourth switching element and the other end connected to the ground.

3. The voltage conversion apparatus according to claim 2, wherein the first DC-DC converter is configured to raise a voltage input through the first input/output terminal to output the raised voltage through the second input/output terminal and configured to lower a voltage input through the second input/output terminal to output the lowered voltage through the first input/output terminal, and wherein the second DC-DC converter is configured to lower a voltage input through the third input/output terminal to output the lowered voltage through the fourth input/output terminal and configured to raise a voltage input through the fourth input/output terminal to output the raised voltage through the third input/output terminal.

4. The voltage conversion apparatus according to claim 1, further comprising:

a fifth power path having one end connected to a midway part of the first power path and the other end connected to the third connection terminal; and a fifth switching element disposed on the fifth power path.

5. The voltage conversion apparatus according to claim 1, further comprising a sixth switching element disposed on the fourth power path.

6. The voltage conversion apparatus according to claim 1, further comprising:

a fifth power path having one end connected to a midway part of the first power path and the other end connected to the third connection terminal;

a fifth switching element disposed on the fifth power path;

a sixth switching element disposed on the fourth power path; and a controller configured to control the first DC-DC converter, the second DC-DC converter, and the first to sixth switching elements, wherein the load is a protected load that requires protection so as to prevent a voltage supplied thereto from dropping, wherein a large current load through which a large current flows during operation and a generator configured to generate regenerated power are connected to the first DC power supply in parallel, wherein the second DC power supply is configured to store the regenerated power generated by the generator, and wherein the controller is configured to operate the first DC-DC converter and the second DC-DC converter, to turn on the fifth switching element, and to turn off the sixth switching element when the generator generates no power and the large current load is not in operation, and configured to operate at least the second DC-DC converter, to turn off the fifth switching element, and to turn on the sixth switching element when the large current load is in operation.

7. The voltage conversion apparatus according to claim 6, further comprising a current detector configured to detect a current flowing from the second DC-DC converter to the first DC-DC converter, wherein, when the generator generates no power and the large current load is in operation, the controller is configured to limit a current flowing to the first DC-DC converter to a specified value that constitutes no obstacle to drive of the protected load or less on the basis of a value detected by the current detector.

8. The voltage conversion apparatus according to claim 6, further comprising a voltage detector configured to detect a voltage of the second DC power supply, wherein, when the generator generates no power and the large current load is in operation, the controller is configured to operate the first DC-DC converter and the second DC-DC converter, to turn off the fifth switching element, and to turn on the sixth switching element when the voltage of the second DC power supply detected by the voltage detector is equal to or more than a predetermined value that is larger than a voltage required to drive the protected load, and configured to operate the second DC-DC converter, to stop the first DC-DC converter, to turn off the fifth switching element, and to turn on the sixth switching element when the voltage of the second DC power supply is less than the predetermined value.

9. The voltage conversion apparatus according to claim 6, wherein the controller is configured to operate the first DC-DC converter and the second DC-DC converter, to turn on the fifth switching element, and to turn off the sixth switching element when the large current load is not in operation to supply power of the second DC power supply to the protected load through the first DC-DC converter, the second DC-DC converter and the fifth switching element and to supply power of the first DC power supply to the protected load through the fifth switching element, and configured to operate the first DC-DC converter and the second DC-DC converter, to turn off the fifth switching element, and to turn on the sixth switching element when the large current load is in operation to supply power of the second DC power supply to the protected load through the second DC-DC converter and the sixth switching element and to supply power of the second DC power supply to the large current load through the first DC-DC converter and the second DC-DC converter.

10. The voltage conversion apparatus according to claim 6, wherein the controller is configured to operate the first DC-DC converter and the second DC-DC converter, to turn on the fifth switching element, and to turn off the sixth switching element when the generator generates regenerated power to charge the second DC power supply with the regenerated power and to supply the regenerated power to the protected load through the fifth switching element.

* * * * *